(12) United States Patent
Jeschke et al.

(10) Patent No.: US 11,492,988 B2
(45) Date of Patent: Nov. 8, 2022

(54) METHOD FOR DETERMINING A CAMSHAFT POSITION IN AN INTERNAL COMBUSTION ENGINE

(71) Applicant: Volkswagen Aktiengesellschaft, Wolfsburg (DE)

(72) Inventors: Jens Jeschke, Braunschweig (DE); Michael Mazur, Hannover (DE); Jens Drueckhammer, Braunschweig (DE); Frank Wildhagen, Lehrte (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 0 days.

(21) Appl. No.: 17/343,367

(22) Filed: Jun. 9, 2021

(65) Prior Publication Data

US 2021/0381452 A1    Dec. 9, 2021

(30) Foreign Application Priority Data

Jun. 9, 2020    (DE) ..................... 10 2020 207 172.1

(51) Int. Cl.
| | | |
|---|---|---|
| *F02D 41/00* | (2006.01) | |
| *F02D 41/14* | (2006.01) | |
| *F02D 13/02* | (2006.01) | |
| *F02D 41/28* | (2006.01) | |

(52) U.S. Cl.
CPC ....... *F02D 41/009* (2013.01); *F02D 13/0207* (2013.01); *F02D 41/1401* (2013.01); *F02D 41/1448* (2013.01); *F02D 2041/001* (2013.01); *F02D 2041/1432* (2013.01); *F02D 2041/1433* (2013.01); *F02D 2041/288* (2013.01); *F02D 2200/0406* (2013.01)

(58) Field of Classification Search
CPC ... F02D 13/0203–0219; F02D 41/0002; F02D 41/009; F02D 41/1401; F02D 41/144; F02D 41/1448; F02D 2041/001; F02D 2041/1432; F02D 2041/1433; F02D 2041/288; F02D 2200/0402; F02D 2200/0406
See application file for complete search history.

(56) References Cited

U.S. PATENT DOCUMENTS

| | | |
|---|---|---|
| 5,495,830 A | 3/1996 | Wu |
| 7,213,550 B2 | 5/2007 | Nishida |
| 10,450,977 B2 | 10/2019 | Kainz et al. |
| 10,718,283 B2 | 7/2020 | Braun |

(Continued)

FOREIGN PATENT DOCUMENTS

| | | |
|---|---|---|
| DE | 10 2004 001 102 A1 | 8/2004 |
| DE | 10 2008 001 099 A1 | 10/2009 |

(Continued)

*Primary Examiner* — John M Zaleskas
(74) *Attorney, Agent, or Firm* — Muncy, Geissler, Olds & Lowe, P.C.

(57) ABSTRACT

A method for determining a combination of an actual intake camshaft phase position of an intake camshaft and an actual exhaust camshaft phase position of an exhaust camshaft of a production internal combustion engine having at least one cylinder, wherein the method is performed in operation of the production internal combustion engine and the relevant actual phase position of the camshafts is determined in relation to an operating point of the production internal combustion engine.

14 Claims, 2 Drawing Sheets

(56) References Cited

U.S. PATENT DOCUMENTS

| | | | | |
|---|---|---|---|---|
| 2007/0012096 A1* | 1/2007 | Galtier | .................... | F02D 13/02 73/114.31 |
| 2007/0233356 A1* | 10/2007 | Weiss | .................... | F01L 1/3442 701/105 |
| 2008/0236267 A1* | 10/2008 | Hartmann | ............. | F02D 41/221 73/114.37 |
| 2009/0182491 A1* | 7/2009 | Bauer | .................... | F02D 41/009 701/115 |
| 2011/0093182 A1* | 4/2011 | Weber | ................. | F02D 41/1448 73/114.25 |
| 2011/0137509 A1* | 6/2011 | Sarac | ...................... | F02D 13/02 701/31.4 |
| 2011/0167900 A1* | 7/2011 | Zanotti | ............... | F02D 13/0223 73/114.37 |
| 2014/0245823 A1* | 9/2014 | Melzig | ................. | F02D 41/221 73/114.76 |
| 2017/0198649 A1* | 7/2017 | Kainz | ................... | F02D 41/009 |
| 2017/0292461 A1* | 10/2017 | Zhang | ................ | F02D 41/3809 |
| 2018/0051598 A1* | 2/2018 | Pedro | ....................... | B60K 6/48 |
| 2018/0355815 A1* | 12/2018 | Braun | ................ | F02D 41/3005 |
| 2019/0360365 A1* | 11/2019 | Traballano | .............. | F01L 1/344 |
| 2019/0368384 A1* | 12/2019 | Dahlgren | ............ | F02D 41/2432 |
| 2020/0040829 A1* | 2/2020 | Braun | ................... | F02D 41/009 |
| 2020/0040830 A1* | 2/2020 | Braun | ...................... | F01L 1/34 |
| 2020/0063674 A1* | 2/2020 | Braun | ................. | F02D 41/2432 |
| 2020/0284212 A1* | 9/2020 | Braun | .................. | F02D 41/009 |
| 2021/0047946 A1* | 2/2021 | Mazur | ....................... | F01L 1/46 |

FOREIGN PATENT DOCUMENTS

| | | |
|---|---|---|
| DE | 10 2015 209 665 A1 | 12/2015 |
| DE | 10 2016 219 582 B3 | 6/2017 |
| EP | 1460254 A1 * 9/2004 | .......... F01L 13/0015 |

* cited by examiner

METHOD FOR DETERMINING A CAMSHAFT POSITION IN AN INTERNAL COMBUSTION ENGINE

This nonprovisional application claims priority under 35 U.S.C. § 119(a) to German Patent Application No. 10 2020 207 172.1, which was filed in Germany on Jun. 9, 2020 and which is herein incorporated by reference.

BACKGROUND OF THE INVENTION

Field of the Invention

The present invention relates to a method for determining a camshaft position in an internal combustion engine.

Description of the Background Art

Modern internal combustion engines—such as spark ignition engines, for example—are continuously being improved. An important component of improvements in fuel consumption and emissions characteristics is achieved through demand-based and maximally energy efficient proportioning of the cylinder charge (as a mixture of fresh air and residual gas). The charge exchange control devices take on a prominent role here, since both the overall charge mass and the composition (residual gas) can be adjusted on demand over wide ranges, in particular through phase control of the intake and exhaust camshafts. The influence or leverage exerted on the principal combustion parameters (overall charge mass and residual gas fraction) by the phase control (in more complex systems also stroke curve control such as ACT or ACT+ through AVS) depends largely on the instantaneous boundary parameters of the external gas system of the internal combustion engine. Especially relevant for the influence or leverage of the phase control, in addition to the passive ambient conditions such as ambient pressure and temperature, are the "available" intake manifold pressure at the intake side of the internal combustion engine as a combination of boost (VTG position, exhaust-gas enthalpy) and throttling (throttle valve) and the "available" scavenging gradient between exhaust gas back pressure at the exhaust side of the internal combustion engine and intake manifold pressure as a driver for proportioning the internal residual gas mass. Depending on the resultant pressure conditions in the intake manifold at the intake side and in the exhaust manifold at the exhaust side, it is necessary to adapt the control of the phase positions of the intake and exhaust camshafts, which is to say the timing of the intake and exhaust valves, to these conditions.

It is the goal here to optimize this interaction even in dynamic operation of the internal combustion engine and to proportion in situ such that minimal fuel consumption occurs with acceptable running characteristics. Consequently, the optimal conditions are in the region of the smallest possible pressure differences (small derivative actions: throttle valve and scavenging gradient), since unnecessarily high pressure levels mean energy expenditure that is then not used as propulsion (technical work). The optimization of the charge exchange has the result, for example, of proportioning the residual gas mass (or the internal AGR) with the smallest possible scavenging gradient. However, since the mass flows are fundamentally driven through the pressure differential, fine proportioning and control take place through the geometric path (effective cross-sectional area). The change in the geometric parameters (in this example valve lift curves by means of phase position) in pressure difference situations close to pressure equalization then has very great leverage on the target variables. In other words: Due to the optimization goal of "fuel consumption," the system is preferably operated in a very delicate, sensitive region in which the geometric parameters have massive effects on the overall process.

In this situation, it is increasingly important to know the precise, absolute geometric characteristics of the system (of each individual specimen). For phase control, along with the geometric manufacturing accuracy of valves, camshafts, etc., this is most particularly also the positioning of the camshafts relative to the crankshaft and the assembly of the pulse-generator wheels including sensors. In modern internal combustion engines, the installation situation of this system is measured at the end of manufacture and is associated with the relevant components. These specific installation values are read into the engine control unit, and are taken into account in operation of the engine during the determination of the positions of the intake and exhaust camshafts. As long as the installation situation is not disrupted by wear or maintenance, a very accurate position detection of the camshafts is provided in this way. In the event that components are replaced, the specific installation values of the new part must be transferred into the control unit after completion of the work. If components were improperly replaced, then the positioning of the camshafts potentially would not correspond to physical reality, and operation of the vehicle would be impaired in that the optimal fuel consumption and emission values could no longer be achieved. In order to prevent this, the unqualified replacement of components could be prevented mechanically. Another alternative would be a method that can detect, monitor, and if applicable adapt, the physical reality in operation of the internal combustion engine.

One approach for this alternative is to sense the pulsating pressures in the intake and/or exhaust manifold, which is to say on the intake side or exhaust side of the internal combustion engine, and to deduce the positions or phase positions of the intake or exhaust camshaft on the basis of the measured pressure signal. The following relationship ensues as a simplified chain of action: The crankshaft drive with piston and crankshaft creates a cylinder volume that varies cyclically in the combustion cycle. This volume is short-circuited through the opened valves (which is to say the valve lift curve) to the adjacent volumes of the intake manifold or intake side and exhaust manifold or exhaust side. The valve lift curve in question is shifted in its phase by the phase adjustment, and as a result the pressures in the two volumes change according to the position of the valve lift curves relative to the piston motion. A second piece of information about the interaction of the valve lift curve and cylinder volumes is obtained, independently of the position measurement of the camshafts, through measurement of these pressures. If accurately manufactured camshaft shapes, cylinder geometries, and minimally varying valve lash are assumed, then the phase positions of the camshafts dominate certain aspects in the selected pressure signals.

The accuracy of the detection of the camshaft phase positions depends on other operating parameters such as speed, ambient pressure, VTG and throttle positions, as well as a possible combustion of the fuel/air mixture. These parameters must be reproducibly adjusted for the phase detection, if applicable within relatively narrow limits. This has the result that the detection cannot take place continuously, but rather only under certain selected conditions, such as at certain operating points. The position sensors and pulse-generator wheels of the internal combustion engine, for example sensors for detecting the phase positions of crankshaft and camshafts, cannot be dispensed with in this scenario.

It is known from DE 10 2015 209 665 A1, which corresponds to U.S. Pat. No. 10,450,977, to measure dynamic pressure pulsations in the intake and/or exhaust tract and to detect a crankshaft position or camshaft position feedback signal. The phase angles of selected signal frequencies of the pressure pulsations can be determined from the pressure pulsations and the crankshaft signals by discrete Fourier transform. These phase angles can be compared with reference phase angles and reference valve timing so that valve timing can be determined for the internal combustion engine in question.

It is known from DE 10 2016 219 582 B3, which corresponds to U.S. Pat. No. 10,718,283, to measure dynamic pressure pulsations for an operating point in the intake and exhaust tracts and to detect a crankshaft position or camshaft position feedback signal. The amplitudes of selected signal frequencies of the measured pressure pulsations can be determined from the pressure pulsations and the crankshaft signals by discrete Fourier transform. It is taken into account here that the amplitudes of the individual selected signal frequencies, which is to say the magnitude of the deviation of the pressure pulsation signal with respect to a midline, and the crankshaft phase angle signal are dependent on intake valve stroke phase difference or phase position and the exhaust valve phase difference or phase position. On the basis of the amplitudes that have been determined of the relevant selected signal frequencies, contour lines of equal amplitude that are dependent on intake valve stroke phase difference and exhaust valve stroke phase difference are determined in characteristic maps, wherein these characteristic maps have been determined on a reference engine for these signal frequencies. These contour lines of equal amplitude of the selected different signal frequencies are projected into a common plane spanned by intake valve stroke phase difference and exhaust stroke phase difference. Intersection points of these contour lines yield concrete values for intake valve stroke phase difference or phase position and exhaust stroke phase difference or phase position.

In DE 10 2016 219 582 B3, two signal frequencies are analyzed that have been determined as part of a measurement, which is to say at an operating point of the internal combustion engine, or in other words, for example, the signal frequencies of a pressure signal in the intake tract and/or in the exhaust tract. Because the stability and robustness of the method depend on, e.g., the angle of intersection of the contour lines, high accuracy of the values determined for the actual phase position cannot be established for operating points in which the pressure signals that are determined do not have contour lines whose slopes are clearly different.

SUMMARY OF THE INVENTION

It is therefore an object of the present invention to at least partially solve the problems stated with reference to the prior art. In particular, the aim is to allow a more robust and stable determination of actual phase positions of camshafts.

A method is proposed for determining a combination of an actual intake camshaft phase position of an intake camshaft and an actual exhaust camshaft phase position of an exhaust camshaft of a production internal combustion engine that has at least one cylinder. The method can be performed in operation of the production internal combustion engine. The relevant actual phase position of the camshafts can be determined in relation to an operating point of the production internal combustion engine.

The method comprises at least the following steps:

a. Determining at least one model on a reference internal combustion engine, wherein the at least one model represents, for at least one operating point of the reference internal combustion engine, a relationship between a first pressure signal detected on the reference internal combustion engine (or at least one feature of a first pressure signal) as a function of the actual intake camshaft phase position and the actual exhaust camshaft phase position of the operating point in question;

b. Approaching an operating point with the production internal combustion engine and sensing (e.g., measuring) a second pressure signal at an (assumed) first intake camshaft phase position and an (assumed) first exhaust camshaft phase position, at least during one operating cycle of the at least one cylinder;

c. Processing the second pressure signal with a filtering for selection of at least one signal frequency of the second pressure signal so that the signal frequency can be represented as a curve of a pressure value over time;

d. Dividing the curve of the second pressure signal of the at least one operating cycle into a multiplicity of segments, wherein each segment comprises a time interval;

e. Determining at least one (first) feature of the second pressure signal in one of the segments, wherein the first feature describes the second pressure signal at a point in time within the segment;

f. Comparing at least this first feature with a corresponding feature of the first pressure signal stored in the model, and determining the actual intake camshaft phase position and the actual exhaust camshaft phase position.

The above (not definitive) division of the steps of the method into a) to f) is primarily intended merely to serve the purpose of distinction, and not to force any sequence and/or dependency. Even the frequency of the method steps can vary, for example during setup and/or operation of the system. It is likewise possible that method steps may at least partially overlap one another in time. It is most especially preferred for method steps b) to f) to take place after step a). In particular, steps c) to f) take place during or immediately after or at least partially parallel in time with step b). In particular, steps a) to f) are carried out in the stated order.

The rotational position of a crankshaft of an internal combustion engine determines the position of a piston in a cylinder of the internal combustion engine and, when multiple cylinders are present, in particular determines the position of the pistons relative to one another. In order to improve emissions and/or power output of the internal combustion engine, the phase positions of each individual camshaft, and thus the timing of the valves (intake valve, exhaust valve), can be adjusted individually. In so doing, the timing of the valves can be changed in operation of the internal combustion engine by adjusting the phase position of the camshaft in question, but only jointly for all valves actuated by the relevant camshaft. In this way, a desired combination of phase positions of the camshafts and valve timings determined thereby can be set for each operating point of the internal combustion engine. A specified combination of the phase positions of the camshafts is therefore present during the rotation of the crankshaft at an operating point, which is defined, for example, by a speed of the crankshaft, a torque that is present, and a phase position of the camshafts.

The proposed method is intended, in particular, to make it possible for a regulation of the camshafts to be checked, and if necessary changed or corrected, during operation.

In particular, specific combinations of camshaft phase positions are specified by a control unit for specific operating points of the internal combustion engine. In this process, the phase position of each camshaft is determined as a function of a rotary position of the crankshaft. For example, it may happen as a result of a change of components that a camshaft phase position specified (assumed) by the control unit is not actually realized, but instead at least one camshaft occupies a different actual phase position deviating from a specified target phase position. The intent is for the proposed method to make it possible for this actual phase position of the camshafts that exists in reality to be detected and matched with the control variables specified by the control unit. From the matching, a correction can be carried out in the control unit so that the control variables specified by the control unit can set a desired and reproducible phase position of the camshafts from this point in time onward.

In particular, it is a prerequisite for the method that the errors in the camshaft phase positions are determined by components and tolerances (e.g., installation errors of a sensor, pulse-generator wheel, etc.), and thus the relative adjustment of the camshaft phase positions can be set and sensed from one operating point to another operating point with the same quality or accuracy as the repeated approach to an operating point with a specific combination of camshaft phase positions.

The method makes it possible, in particular, to compare predetermined features of a (second) pressure signal of the production internal combustion engine with identical features of a comparable (first) pressure signal detected on a reference internal combustion engine. In this process, identical operating points, in particular, are approached since the pressure signals arising in this case should correspond to one another.

In particular, features of a pressure signal that each occur at a specific point in time are compared with one another here. In this context, the points in time can be associated with concrete, for instance measured, angular positions of the crankshaft on the basis of the curve of the pressure signal.

In the following, the term "feature" can refer to a feature detected within the framework of the method on the reference internal combustion engine or on the production internal combustion engine, and, in particular, also includes the term "first feature."

In particular, the pressure signal can be a fundamental oscillation of a pressure curve on the inlet side or the outlet side of the internal combustion engine. In particular, the fundamental oscillation is at the ignition frequency of the internal combustion engine. Over an operating cycle of the internal combustion engine, a fundamental oscillation is repeated, in particular according to the number of cylinders, which is to say four times for four cylinders. The operating cycle of a four-stroke internal combustion engine comprises, in particular, an angular range of 720 degrees, which is to say two rotations of the crankshaft.

In particular, the second pressure signal, or its curve, can be divided into segments, for example into rising segments (which is to say segments in which the second pressure signal changes, starting from a low pressure value or a minimum of the second pressure signal, to a high pressure value or a maximum of the second pressure signal) and falling segments (which is to say segments in which the second pressure signal changes, starting from a high pressure value or a maximum, to a low pressure value or a minimum). The at least one (first) feature, for example, can be present or sensed in each segment.

The consideration of the individual segments (with regard to the features stored in the model and detected on the production internal combustion engine) permits an association of the feature being considered with a concrete cylinder of the internal combustion engine, for example. It is thus specifically not the case that all fundamental oscillations are superimposed and a feature is determined from their superposition (as in the case of a Fourier transform, for example), but instead it is possible to associate a feature with a specific crankshaft position (in the case of a four-stroke internal combustion engine, every crankshaft position over a range of 720 degrees of angle in each case). In this way, damage that occurs only to at least one cylinder of the production internal combustion engine, for example, can be detected from the second pressure signal or the relevant first feature. In addition, the association of segments with cylinders also yields advantages with every type of asymmetric (anharmonic) pressure signals, such as cylinder deactivation and separate air ducting to cylinder groups.

Additional advantages of the method proposed here, in comparison with an analysis of the pressure signal with an FFT, in particular on the basis of the segments that can be considered separately for each cylinder with the proposed method, are: usability when some of the cylinders are deactivated: for example in half engine operation, in which case the pressure signal then no longer has the harmonic fundamental order of full engine four cycle operation; and/or usability in the case of separate air/exhaust ducting for cylinder banks: for example in a V8 engine with separate paths and separate pressure sensors ahead of each cylinder bank, in which case the pressure signals are then each more anharmonic (which is to say worse for an FFT analysis that is equally valid for all cylinders).

To sense the actual phase position of the camshafts, according to step a) at least one model or a multiplicity of models is/are detected on a reference internal combustion engine.

In these models, the actual phase positions of the camshafts and the first pressure signal or the at least one feature of the first pressure signal are stored for the specific operating point. These models are stored in a control unit in operation of the production internal combustion engine and are accepted as valid. In this process, different combinations of the actual phase positions of the camshafts and the feature of the first pressure signal detected in each case are sensed for an operating point of the reference internal combustion engine, defined, for example, by speed of the crankshaft and a torque that is present as well as by a target phase position of the camshaft. In operation of the production internal combustion engine, the operating points for which models are stored, in particular, are approached in order to carry out the method.

The actual phase positions and features can be determined on the reference internal combustion engine by sensors, for example by pressure sensors, angle-of-rotation sensors, etc., wherein the reference internal combustion engine is distinguished by especially small deviations and components that are known especially accurately.

It is thus assumed that the target phase position corresponds to the actual phase position on the reference internal combustion engine.

In particular, one model apiece can be created for each operating point and stored in the control unit. The model describes the relationship between the actual phase positions and the first pressure signal or the at least one feature of the first pressure signal.

Each model can have a multiplicity of characteristic maps or submodels. A first characteristic map or submodel of a model comprises the feature detected for the relevant combination, for example starting from specific values of the actual intake camshaft phase position and values of the actual exhaust camshaft phase position that are set as a function thereof.

Starting from specific values of the actual intake camshaft phase position and values of the feature of the first pressure signal present in each case, for example, a second characteristic map or submodel of a model comprises the actual exhaust camshaft phase position that is present in each case for this combination and at this operating point.

Starting from specific values of the actual exhaust camshaft phase position and values of the feature of the first pressure signal present in each case, for example, a third characteristic map or submodel of a model comprises the actual intake camshaft phase position that is present in each case for this combination and at this operating point.

The second and third characteristic maps can each be determined by, for example, inversion of the first characteristic map.

Thus, each characteristic map or submodel starts from specific values of two input variables and describes the applicable third variable. Taking the first characteristic map as a starting point, it is thus possible to create a second characteristic map (submodel) by inverting the first characteristic map, for example. Then, starting from specific values of the actual intake camshaft phase position, the second characteristic map comprises the features detected as a function thereof and the values of the actual exhaust camshaft phase position set for the combination in question. A third characteristic map (submodel) can likewise be created by inverting the first characteristic map. Starting from specific values of the actual exhaust camshaft phase position, the third characteristic map then comprises the features detected as a function thereof and the values of the actual intake camshaft phase position set for the combination in question.

Storage of the multiplicity of characteristic maps (submodels) can, in particular, reduce a computational effort required for carrying out the method in operation of the production internal combustion engine, since readout of the relevant values of the phase positions can be simplified for features detected in operation.

In particular, arbitrary values for actual phase positions and features are determined later by interpolation with the aid of the characteristic maps or submodels.

In particular, the characteristic maps or models can also be realized or replaced by systems of equations.

According to steps b) to e), the at least one feature of the second pressure signal is sensed and analyzed at least at one operating point in operation of the production internal combustion engine. In this process, the phase position of the camshafts that is present at the applicable operating point (but may not be correct because of misadjustment) is likewise sensed. These sensed phase positions are used in step f), in particular, in order to determine the deviation of the phase positions set (but not actually present) in step b) from actual phase positions that exist in reality, so that values for the phase position that have been corrected, if necessary, by this deviation can be used in subsequent operation of the production internal combustion engine.

The operating points approached in operation of the production internal combustion engine correspond, in particular, to the operating points for which the models are stored in the control unit.

In particular, the second pressure signals sensed in step b) or the at least one feature determined in step e) are compared with the models in step f).

The possible combinations of the actual phase positions of the camshafts for this operating point approached in step b) and the feature sensed according to step e) can be read out from the models. It is determined, for example, for which actual values of the intake camshaft phase position this feature is present, and thus which actual exhaust camshaft phase position is present. It is also determined, for example, for which values of the actual exhaust camshaft phase position this feature is present, and thus which actual intake camshaft phase position is present. The combinations of parameters thus determined can be modeled by a function, for example. The function can produce a line in a graph, for example. For example, the actual intake camshaft phase position can be plotted on a first axis in the graph and the actual exhaust camshaft phase position can be plotted on a second axis.

Approaching multiple operating points and/or comparing multiple features can increase the accuracy of the determination of the actual camshaft phase positions here.

The combinations of parameters can also be viewed as a point cloud, wherein the individual points of the point cloud are formed by the combinations of the actual intake camshaft phase position and the actual exhaust camshaft phase position derived from the models for the feature determined in step e). Since every point of the point cloud has the coordinates of the applicable combination of actual camshaft phase positions for this one feature, the point cloud has only two dimensions in the present case.

In a graph representing these two dimensions, the combinations of actual camshaft phase positions for which the measured feature arises in the model or submodel can be represented as, for example, a contour line in the model or submodel.

The particular point cloud is composed, in particular, of points that can be read out from the characteristic maps or submodels. For example, the point cloud determined for the one operating point is composed of the actual intake camshaft phase positions present for the sensed feature as well as the actual exhaust camshaft phase positions present for this actual intake camshaft phase position and this operating point. The actual exhaust camshaft phase position is thus read out, in particular, from the corresponding characteristic map or submodel that is already stored in the control unit or has been determined in operation of the production internal combustion engine. In addition, the point cloud is composed of the actual exhaust camshaft phase positions present for the sensed feature as well as the actual intake camshaft phase positions present for this actual exhaust camshaft phase position and this operating point.

The point cloud determined for the one operating point is composed, in particular, of the points derived from the above-described second characteristic map and of the points derived from the above-described third characteristic map. The corresponding values of the actual intake camshaft phase position and the values of the actual exhaust camshaft phase position present for this combination can be read out for the measured feature from the second characteristic map. The combinations of these values constitute the individual points of the point cloud derived from the second characteristic map here. The corresponding values of the actual exhaust camshaft phase position and the values of the actual intake camshaft phase position present for this combination can be read out for the measured feature from the third characteristic map. The combinations of these values constitute the individual points of the point cloud derived from the third characteristic map here.

In order to detect the actual camshaft phase positions, an intersection point of point clouds is determined, in particular, wherein the point clouds that are brought into intersection by determining an additional feature (in particular a different feature from the feature determined and used thus far) from the same pressure signal (which is to say the same operating point) or by approaching at least one different operating point with the production internal combustion engine and sensing (e.g., measuring) an additional (third) pressure signal at an (assumed) different intake camshaft phase position and an (assumed) different exhaust camshaft phase position and determining an additional feature (in particular the same feature as the feature determined at the different operating point, or a different feature) from this different (third) pressure signal.

It is thus possible, in particular, to approach a freely selectable number of operating points, wherein the robustness and stability of the result, which is to say the determination of the actual camshaft phase positions, can be influenced solely through the number of mutually different operating points. Furthermore, specific combinations of operating points can be selected, which allows the most robust possible determination of the actual phase positions of the camshafts. However, the method can also include the determination of multiple features from a pressure signal that has been detected or measured at the same operating point, wherein the point clouds then differ only with regard to the feature in question.

A validation can be carried out with just the model or the submodels in this case. It is possible to check, for example, whether an unambiguous behavior of the points forming the point cloud in question can be expected for the selected operating points, at least in a subregion of the point clouds that includes the assumed or expected camshaft phase positions. If not, only permissible regions of the point cloud can be selected or a different operating point is approached or the operating point is approached repeatedly or the second pressure signal is sensed again.

For example, the points detected from one submodel may form a circle in a graph. If the points detected from the other submodel supplement this circle, but only supplement the first point cloud in one quadrant of the circle, for example, then this quadrant and the points contained therein can be meaningfully used as a point cloud.

In particular, at least one additional feature is sensed from the relevant second pressure signal in step e), wherein models for this additional feature were likewise created in step a), which models are drawn upon in step f). The additional feature can be, e.g., the signal of an additional pressure sensor. This sensor can be arranged in the intake tract or in the exhaust tract, for example. The additional feature can also comprise a different feature of the same (first and/or second) pressure signal, such as an amplitude, a maximum value, a minimum value, a slope, etc.

In particular, the second pressure signal in the production internal combustion engine is sensed at least in an intake side or in an exhaust side of the production internal combustion engine by means of a pressure sensor located there. The relevant at least one feature of the second pressure signal can be determined from the sensed second pressure signal, for example in a control unit of the production internal combustion engine.

The intersection point of the point clouds forms, in particular, the combination of actual phase positions, which is to say the actual intake camshaft phase position and the actual exhaust camshaft phase position that exist in reality at the at least one operating point according to step b).

These values of the actual phase positions can now be used to recalibrate the values used until this current point in time for the assumed phase positions (which is to say the first phase positions, for example). A deviation in the actual phase position of the camshaft in question from the phase position that was set until then is therefore recognized, and the control variable in the control unit is changed on the basis of this deviation. After that, the (target) phase position set on the production internal combustion engine, which is to say the first phase position, for example, should correspond to the relevant actual phase position that exists in reality.

The control variable can be the phase position of a camshaft, for example. With the method, deviations between the actual phase position that exists in reality and a (target) phase position set and assumed on the production internal combustion engine can be detected, and the phase position of the camshaft can be corrected or calibrated. The newly set phase positions should then correspond, in particular, to the actual phase positions. This state can, in particular, also be checked and validated by the present method.

In step c), processing of the second pressure signal with a filtering for selection of at least one signal frequency of the second pressure signal takes place so that the signal frequency can be represented as a curve of a pressure value as a function of time or as a function of the crankshaft angle. In particular, the curve of the signal frequency, or in other words of the pressure value, can be represented in a graph, wherein a pressure value of the second pressure signal is plotted on a vertical axis and the time or the running crankshaft angle is plotted on a horizontal axis.

For division of the second pressure signal into segments, the second pressure signal is processed in an especially simple, robust method, in particular with a Fourier transform. In particular, only one signal frequency of the second pressure signal, for example a fundamental oscillation of the second pressure signal, is taken into account.

The division into segments can be specified by a priori knowledge, for example through the identification of extreme values of the pressure signal (for example, on the basis of the target positions of the camshaft phase positions). In this case it is necessary to consider, however, that a coupling may arise here, which is to say that the extreme values are reliably detected only when the actual camshaft phase positions do not have a large deviation from the assumed camshaft phase positions.

This coupling is not present when the segments are determined using the dominant frequency, since the positions of the extreme values (which is to say along the time axis) are determined solely from the pressure signal.

According to step d), the division of the curve of the second pressure signal of the at least one operating cycle into a multiplicity of segments takes place, wherein each segment comprises a time interval. Each segment comprises, in particular, a time interval or an interval of the crankshaft angle.

In particular, it is possible to determine for each segment a multiplicity of (different) features that can be matched with the at least one model detected on the reference internal combustion engine and the features stored therein. In particular, a segment comprises a time interval, or an interval of the crankshaft angle, that is defined by two adjacent extreme values.

An operating cycle of a four-stroke internal combustion engine then comprises eight segments, for example.

The start point and/or the end point of a segment can be determined, in particular, on the basis of extreme values (e.g., maximum and minimum) of the curve of the second pressure signal. In particular, the time interval of a segment can be determined on the basis of a maximum and a minimum of the curve of the second pressure signal. In particular, an overlap (along the time axis) with an adjacent segment can be provided for a segment, so that each extreme value can also be used for multiple segments. In particular, each segment includes only one (global) maximum and only one (global) minimum of the curve of the second pressure signal.

Features that can be compared with the features of the at least one model determined in step a) can be identified for each segment or for the curve. In this process, the features of each segment can be identified, for example on the basis of the position of the extreme values or on the basis of the position of other characteristic values.

In particular, a common model can be created and stored in the control unit for a multiplicity of segments. It is also possible, however, for one model for exactly one segment in each case to be created and stored in the control unit. The computing time in operation of the production internal combustion engine may possibly be shortened in this way. However, the memory capacity in the control unit may also possibly be reduced in this way, since models for only specific segments or individual segments, for example, are stored in the control unit.

In step d), a determination of extreme values of the second pressure signal with respect to the time axis or the crankshaft angle takes place, in particular. The segments can thus be identified or specified on the basis of the position of the extreme values.

In step e), the selection takes place, in particular, of a region of the second pressure signal that is located, for example, between two adjacent extreme values of the second pressure signal, which is to say between a maximum and a minimum. The region thus comprises, in particular, a section of the curve of the pressure signal located within a time interval. In particular, the time interval can be associated with concrete crankshaft angles. In particular, the section is located in one segment (at a time) of the segments determined in step d). This section is, in particular, smaller than the time interval of a segment.

In particular, this section of the curve of the second pressure signal can be approximated by a function, in particular by a straight line. The approximation can be accomplished by approximation methods or other mathematical methods. The function can also be nonlinear, for example a parabolic or exponential function. This approximation can, in particular, be carried out by the control unit.

The approximation of the curve by a straight line increases stability against measurement errors and noise. Thus, if the curve is continuous in this section, numerically robust, noise-resistant information can be provided for detecting the actual phase position.

In particular, the amplitude between the adjacent extreme values, which is to say the maximum and the minimum, can be normalized. The section comprises, in particular, a section time interval in which the curve has at least the first value "50% of the normalized amplitude."

In this section of the time interval, a rapid change in a pressure value, in particular, is present with respect to the change in time or in the crankshaft angle. The speed of the change is visualized by, in particular, the slope of the curve of the second pressure signal in this section of the curve.

In particular, the section comprises a section time interval that is defined by a symmetric interval with respect to the normalized amplitude. In particular, the section thus comprises, for example, a section time interval that comprises the curve of the second pressure signal between a second value "30% of the normalized amplitude" and a third value "70% of the normalized amplitude." In this section, the greatest slope of the curve, in particular, can be assumed to be present or the curve of the second pressure signal can be expected to be significant for the determination of the actual camshaft phase positions.

The approximation of the curve in this section can be accomplished by, for example, a straight line function or another function that extends from the second value to the third value over the detected time interval. In this case, a crossing point of a straight line or other function thus determined with, e.g., the first value "50% of the normalized amplitude" can yield a concrete point in time or a concrete crankshaft angle. This point in time, or the deviation of this point in time relative to a time average between the extreme values (the time average corresponds to, e.g., the point in time that lies at 50% of the time difference between the extreme values), can be identified as the first feature, for example taking into account the relevant segment, and can be used for determination of the actual camshaft phase positions according to step f).

Whereas this deviation in the point in time and/or the slope, for example, can be used as the first feature in the case of a straight line function, a parameter of the relevant curve segment, for example, can be determined as a feature in the case of a different function.

In particular, the at least one first feature is detected in regions of the curve of the second pressure signal that have, e.g., a large slope, which is to say specifically not in regions of the extreme values.

In this way, the present method makes possible, in particular, a more robust and more stable result, and in particular a more accurate result, for the actual phase positions of the camshafts.

In particular, according to step f) a comparison takes place of the at least one feature, for example the deviation of the point in time and/or the slope of the curve in a segment or in a section of a segment, with the at least one model or with the corresponding at least one feature in the model. In particular, it is thus possible for an actual phase position of the camshafts to be detected. The values specified by the control unit for the phase positions of the camshafts, which is to say, for example, the first camshaft phase positions, can thus be corrected by a correction factor or value so that correct phase positions of the camshafts can be set in subsequent operation of the production internal combustion engine.

In particular, in step c) a low-pass filtering of the second pressure signal takes place as part of a Fourier transform. In particular, only parts of the second pressure signal up to a certain order are taken into account here, which is to say regions of higher frequency are damped.

In particular, in step c) a band-pass filtering of the second pressure signal takes place as part of a Fourier transform. In particular, only parts of the second pressure signal, for example of one order, are taken into account here. In particular, therefore, regions of lower and higher frequency are damped.

In particular, the detection of features of each segment permits an association of the features with individual cylinders. As a result, features of different segments, which is to say of different cylinders, can be compared with one another. In particular, diagnosis of the production internal combustion engine and its components, e.g., sensors, is possible in this way. In particular, any damage that might arise can be associated with individual cylinders.

In the method proposed by DE 10 2016 219 582 B3, only the FFT coefficients of amplitude and phase position were detected. These represent an averaging of the parameters amplitude and phase position for all cylinders. An association of features with individual cylinders is not possible there.

In particular, the curve of the pressure value of the at least one signal frequency with respect to the time or the crankshaft angle is detected from the sensed second pressure signal using a Fourier transform.

In particular, at least one of the following features can be determined in step e): pressure value and point in time or crankshaft angle of at least one maximum, pressure value and point in time or crankshaft angle of at least one minimum, amplitude of the curve of the pressure signal, direction of the curve (rising or falling) in the segment or region or section, slope of the curve in a section and/or at a specific point in time and/or at a specific pressure value or value of the pressure value.

In particular, each feature detected by the method can be stored in the at least one model. Each additional feature that is taken into account permits, in particular, a further increase in the robustness and accuracy of the method.

In particular, the second pressure signals in the production internal combustion engine are sensed at least in an intake side and/or in an exhaust side of the production internal combustion engine by means of a pressure sensor located there. The relevant at least one feature of the second pressure signal can be determined from the sensed second pressure signals, for example in a control unit of the production internal combustion engine.

In particular, the actual phase positions determined in step f) are used in a control unit of the production internal combustion engine for correction of control variables provided by the control unit for operation of the production internal combustion engine. In particular, therefore, the control variables used until this point are changed so that, e.g., altered phase positions are set in subsequent operation.

The comparison that took place in step f) of the feature with the at least one model or the intersection point of the point clouds detected in this process yields, in particular, the combination of actual phase positions, which is to say the actual intake camshaft phase position and the actual exhaust camshaft phase position that exist in reality at the analyzed operating point or analyzed operating points.

These values of the actual phase positions can now be used to recalibrate the values used until this current point in time for the assumed phase positions (which is to say the first phase positions, for example). A deviation in the actual phase position of the camshaft in question from the phase position that was set until then is therefore recognized, and the control variable in the control unit is changed on the basis of this deviation. After that, the (target) phase position set on the production internal combustion engine, which is to say the first phase position, for example, should correspond to the relevant actual phase position that exists in reality.

The control variable can be the phase position of a camshaft, for example. With the method, deviations between the actual phase position that exists in reality and a (target) phase position set and assumed on the production internal combustion engine can be detected, and the phase position of the camshaft can be corrected or calibrated. The newly set phase positions should then correspond, in particular, to the actual phase positions. This state can, in particular, also be checked and validated by the present method.

In particular, the control variables provided by the control unit for operation of the production internal combustion engine are changed while taking the actual phase positions into account only when a minimum deviation between the actual phase positions and the comparable control variables is observed. It may occur that a correction is not necessary because the detected deviation of the actual phase position lies within a predefinable tolerance.

In particular, the minimum deviation varies as a function of at least one of the following parameters: speed, crankshaft angle, ambient pressure, VTG position, throttle valve position, composition of the fuel/air mixture. In particular, the minimum deviation can thus have a different value in each case depending on the operating point or parameter, so that a decision can be made as a function of at least one of the stated parameters as to whether a correction of the control variables will be undertaken.

The remarks concerning the second pressure signal and the feature or features derived therefrom also apply, in particular in like manner, to the first pressure signal detected on the reference internal combustion engine.

In addition, an internal combustion engine is proposed, comprising at least a crankshaft, a variable intake camshaft and/or a variable exhaust camshaft, at least one piston connected to the crankshaft, and a cylinder in which the piston carries out reciprocating motions, as well as an intake side through which at least air can be supplied to the cylinder through at least one intake valve that can be actuated by the intake camshaft, and an exhaust side through which exhaust gas can be removed from the cylinder through at least one exhaust valve that can be actuated by the exhaust camshaft. At least one pressure sensor for sensing second pressure signals (or the at least one second pressure signal) is arranged on the intake side and/or on the exhaust side. The internal combustion engine additionally comprises a control unit that is suitably designed or equipped, configured, or programmed for carrying out the method described.

In particular, a control unit is also proposed that is equipped, configured, or programmed for carrying out the method described.

In addition, the method can also be carried out by a computer or with a processor of an electronic controller.

Accordingly, a system for data processing is also proposed that comprises a processor that is adapted/configured such that it carries out the method or a portion of the steps of the proposed method.

A computer-readable storage medium can be provided that includes commands that, when executed by a computer/processor, cause the latter to carry out the method or at least a portion of the steps of the proposed method.

The remarks concerning the method are applicable, in particular, to the internal combustion engine and/or the computer-implemented method (which is to say the computer or the processor, the system for data processing, the computer-readable storage medium), and vice versa.

The use of indefinite articles ("a," "an"), especially in the claims and in the specification describing the claims, is to be understood as such and not as a number. Terms or components introduced accordingly should thus be understood as meaning that at least one instance thereof is present and, in particular, that multiple instances thereof may also be present.

It should be noted by way of precaution that the numerals ("first," "second," . . . ) used here serve primarily (only) to distinguish between multiple objects, variables, or processes of the same kind, which is to say in particular that they do not dictate any dependence and/or sequential order of these objects, variables, or processes relative to one another. If a dependence and/or sequential order should be required, this is explicitly stated here or is readily apparent to a person skilled in the art from studying the embodiment described in concrete terms. If multiple instances of a component can occur ("at least one"), then the description for one of these components can apply equally to all of these components or to a portion of the majority of them, but this is not mandatory.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
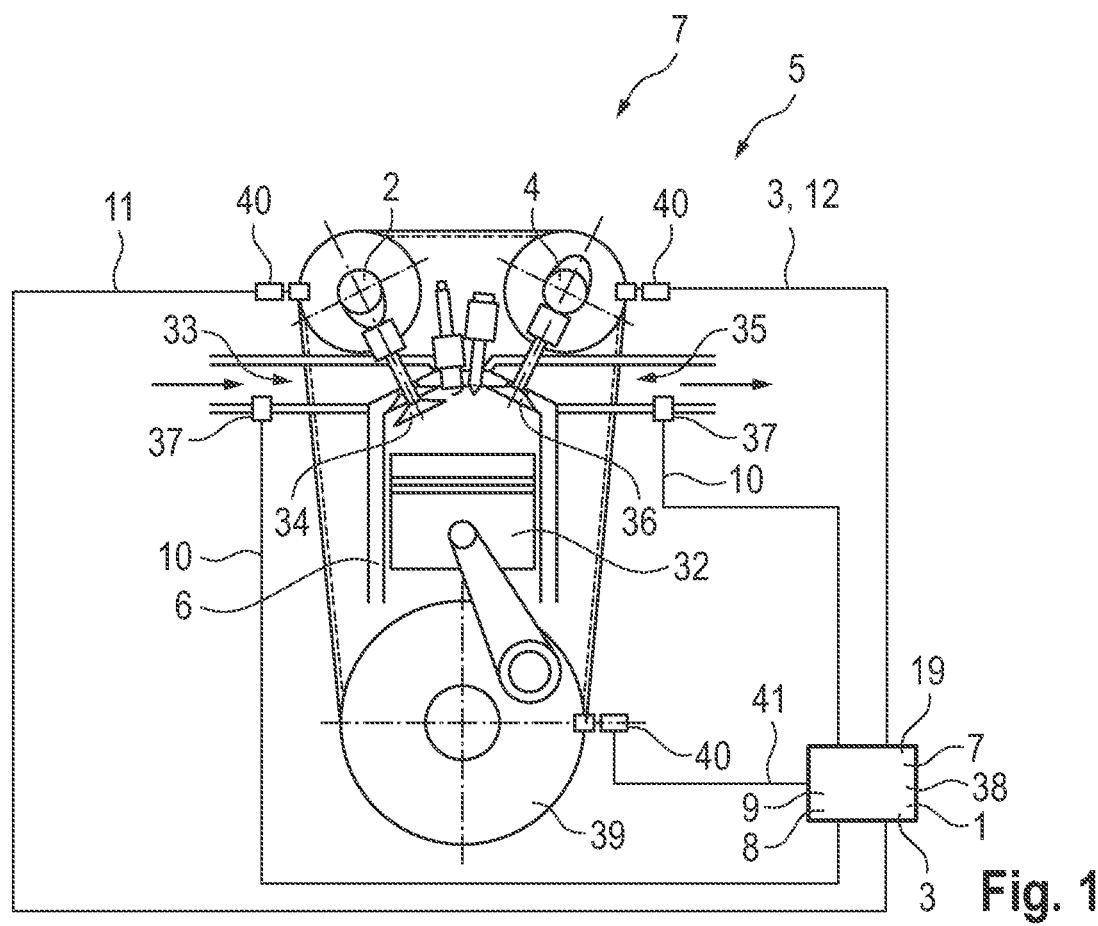
FIG. 1 shows an internal combustion engine in a cross-sectional side view.

FIG. 1 shows a production internal combustion engine 5 in a cross-sectional side view. The production internal combustion engine 5 includes a crankshaft 39, a variable intake camshaft 2 and a variable exhaust camshaft 4, at least one piston 32 connected to the crankshaft 39, and a cylinder 6 in which the piston 32 carries out reciprocating motions, as well as an intake side 33 through which at least air can be supplied to the cylinder 6 through at least one intake valve 34 that can be actuated by the intake camshaft 2, and an exhaust side 35, through which exhaust gas can be removed from the cylinder 6 through at least one exhaust valve 36 that can be actuated by the exhaust camshaft 4. A pressure sensor 37 for sensing pressure signals 10 is arranged in each case on both the intake side 33 and the exhaust side 35 (at least one pressure sensor 37 is required for the method). The production internal combustion engine 5 additionally comprises a control unit 38 that is suitably designed or equipped, configured, or programmed for carrying out the method described.

The method serves the purpose of determining a combination of an actual intake camshaft phase position 1 of an intake camshaft 2 and an actual exhaust camshaft phase position 3 of an exhaust camshaft 4 of a production internal combustion engine 5. The method is performed in operation of the production internal combustion engine 5. The relevant actual phase position 1, 3 of the camshafts 2, 4 is determined in relation to at least one operating point 7 of the production internal combustion engine 5.

In the method, according to step a) a determination of models 8 takes place on a reference internal combustion engine for various operating points 7, wherein each model 8 represents, for one operating point 7 apiece of the reference internal combustion engine, a relationship between a first pressure signal 9 detected on the reference internal combustion engine (or at least one feature 19 of a pressure signal 9) as a function of the actual intake camshaft phase position 1 and the actual exhaust camshaft phase position 3 of the operating point in question 7.

According to step b), the following takes place: an approach of an operating point 7 with the production internal combustion engine 5 and a sensing (e.g., measuring) of a second pressure signal 10 at an (assumed) first intake camshaft phase position 11 and an (assumed) first exhaust camshaft phase position 12 as well as of a crankshaft angle 41 by means of sensors 40 provided for this purpose.

Figure 2:
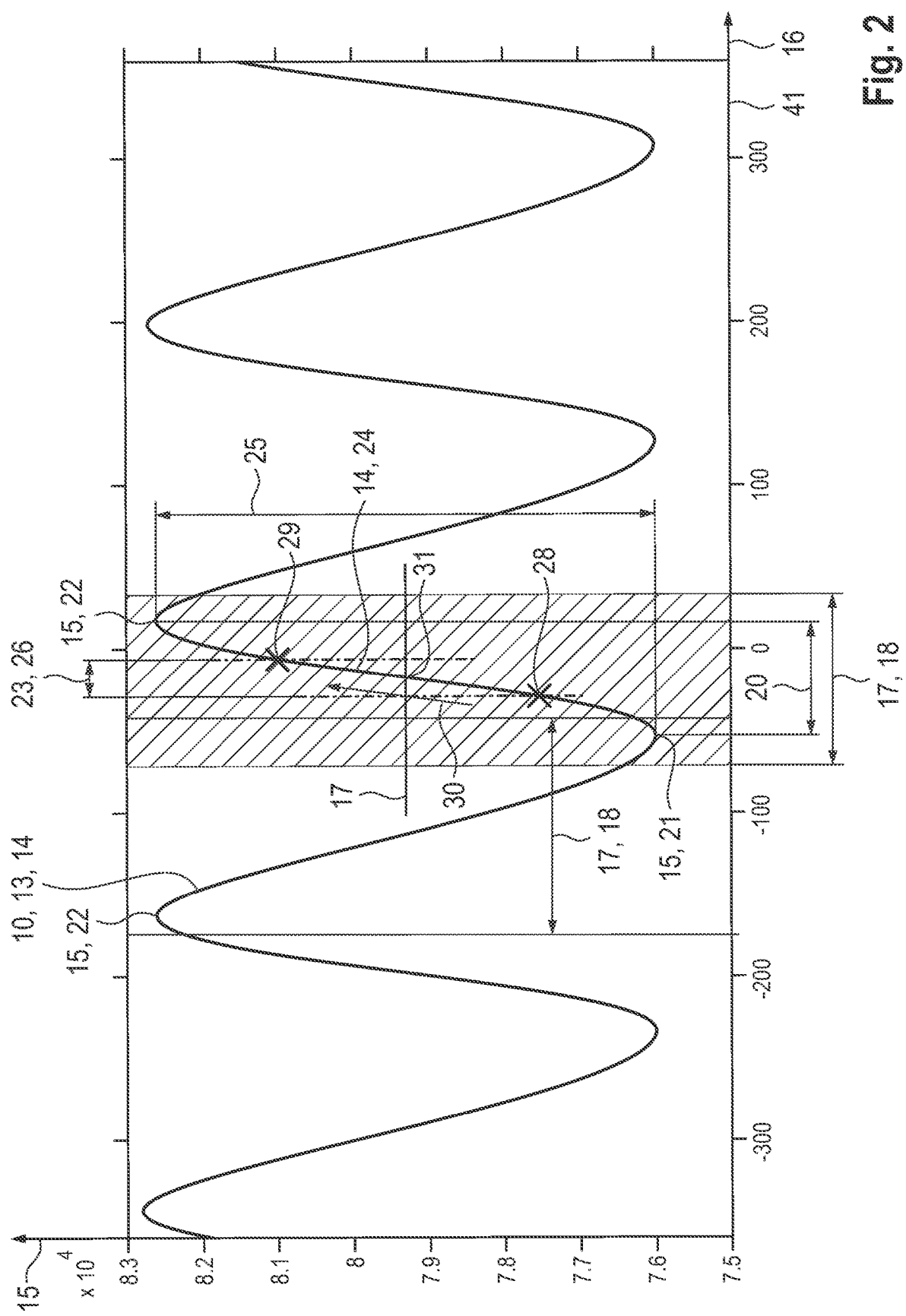
FIG. 2 shows a two-dimensional graph.

According to step c), a processing of the second pressure signal 10 takes place with a filtering for selection of at least one signal frequency 13 of the second pressure signal 10, so that the signal frequency 13 can be represented as a curve 14 of a pressure value 15 over time 16 (see FIG. 2).

FIG. 2 shows a two-dimensional graph. The pressure value 15 of a second pressure signal 10 is plotted on the vertical axis of the graph. The time 16 or the running crankshaft angle 41 of a production internal combustion engine 5 is plotted on the horizontal axis. In addition, the curve 14 of a second pressure signal 10 is represented in the graph. The second pressure signal 10 has been sensed by a pressure sensor 37 on an intake side 33 or on an exhaust side 35 of the internal combustion engine 5. The graph includes the curve 14 of the second pressure signal 10 over an operating cycle of the internal combustion engine 5, which is to say over an angular range of 720 degrees of the crankshaft 39 (in the case of the four-stroke engine). Shown here is a second pressure signal 10 measured at the exhaust side 35 as part of step b) and low-pass filtered as part of step c), up to and including the ninth order.

Thus, the approach of an operating point 7, defined by a combination of actuators of the production internal combustion engine 5, for example by speed, load, throttle valve, turbocharger, camshaft phase positions, takes place in step b). Sensing of the second pressure signal 10 by the pressure sensor 37 on the exhaust side 35 also takes place in step b). In this process, the phase positions of the camshafts 2, 4 specified for this purpose by the control unit 38 are sensed as a function of a time 16 or a point in time 20. The phase positions of the camshafts 2, 4 specified by the control unit 38 are the first intake camshaft phase position 11 and the first exhaust camshaft phase position 12, which may be incorrect and deviate from an actual camshaft phase position 1, 3 that exists in reality, so that the control variables of the control unit 38 relating thereto may need to be corrected.

In step c) processing of the second pressure signal 10 takes place with a filtering for selection of at least one signal frequency 13 of the second pressure signal 10, so that the signal frequency 13 can be represented as a curve 14 of a pressure value 15 over time 16.

The second pressure signal 10 has a fundamental oscillation at the ignition frequency of the production internal combustion engine 5. Over an operating cycle of the production internal combustion engine 5, a fundamental oscillation is repeated according to the number of cylinders 6, which is to say four times for four cylinders 6 in the present case.

According to step d) the division of the curve 14 of the second pressure signal 10 of the at least one operating cycle into a multiplicity of segments 17 takes place, wherein each segment 17 comprises a time interval 18. Each segment 17 can supply a multiplicity of features 19 that can be matched with the model 9 of the reference internal combustion engine.

The segments 17 are divided into rising segments 17, which is to say segments 17 in which the second pressure signal 10 changes, starting from a low pressure value 15 or a minimum 21 of the second pressure signal 10, to a high pressure value 15 or a maximum 22 of the second pressure signal 10, and falling segments 17 in which the second pressure signal 10 changes, starting from a high pressure value 15 or a maximum 22, to a low pressure value 15 or a minimum 21. The at least one feature 19, for example, can be present or sensed in each segment 17.

The consideration of the individual segments 17 (with regard to the features 19 stored in the model 9 and detected on the production internal combustion engine 5) permits an association of the feature 19 being considered with a concrete cylinder 6 of the internal combustion engine 5, for example. It is thus specifically not the case that all fundamental oscillations are superimposed and a feature 19 is determined from their superposition (as in the case of a Fourier transform, for example), but instead it is possible to associate a feature 19 with a specific crankshaft angle position (in the case of a four-stroke internal combustion engine, every crankshaft angle position over a range of 720 degrees of angle in each case). In this way, damage that occurs only to at least one cylinder 6 of the production internal combustion engine 5, for example, can be detected from the second pressure signal 10 or the relevant first feature 19.

In step d) a determination of extreme values of the second pressure signal 10 with respect to the time axis (time 16) or the crankshaft phase position takes place. The segments 17 are identified or specified in the present case on the basis of the position of the extreme values, which is to say the minima 21 and maxima 22.

In step e), the selection takes place of a region of the second pressure signal 10 that is located between two adjacent extreme values of the second pressure signal 10, which is to say between a maximum 22 and a minimum 21. The region comprises a section 23 of the curve 14 of the second pressure signal 10 located within a time interval 18. The time interval 18 can be associated with a concrete crankshaft angle 41. The section 23 is located in one of the segments 17 determined in step d). The section 23 or the section time interval 26 is smaller than the time interval 18 of a segment 17.

The section 23 comprises a section time interval 26 that is defined by a symmetric interval with respect to the normalized amplitude. The section 23 comprises a section time interval 26 that comprises the curve 14 of the second pressure signal 10 between a second value 28 "30% of the normalized amplitude" and a third value 29 "70% of the normalized amplitude." In this section 23, the greatest slope 30 of the curve 14, in particular, can be assumed to be present or the curve of the second pressure signal 10 can be expected to be significant for the determination of the actual camshaft phase positions 1, 3.

The section 23 of the curve 14 of the second pressure signal 10 can be approximated by a function 24, here by a straight line. The approximation can be accomplished by approximation methods or other mathematical methods. The approximation can be carried out by the control unit 38.

The approximation of the curve 14 by a straight line or by linear regression increases stability against measurement errors and noise, in particular because a pronounced slope 30 is present here and because more than one sample value is used. Thus, if the curve 14 is continuous in this section 23, numerically robust, noise-resistant information can be provided for detecting the actual phase position 1, 3.

The amplitude 25 between the adjacent extreme values, which is to say the maximum 22 and the minimum 21, is normalized, and thus extends between the pressure values 15 from "0" to "1." The section 23 comprises a section time interval 26, in which the curve 14 has at least the first value 27 "50% of the normalized amplitude."

In this section 23 of the time interval 18 a rapid change in a pressure value 15 is present with respect to the change in time 16 or in the crankshaft angle. The speed of the change is visualized by the slope 30 of the curve 14 of the second pressure signal 10 in this section 23 of the curve 14.

The approximation of the curve 14 in this section 23 can be accomplished by, for example, a straight line function 24 or another function 24 that extends from the second value 28 to the third value 29 over the detected section time interval 26. In this case, a crossing point 31 of a straight line thus determined with the first value 17 "50% of the normalized amplitude" can yield a concrete point in time 20 or a concrete crankshaft phase position. This point in time 20, or the deviation of this point in time 20 relative to a time average between the extreme values (the time average corresponds to, e.g., the point in time that lies at 50% of the time difference between the extreme values), can be identified as the first feature 19, for example taking into account the relevant segment 17, and can be used for determination of the actual camshaft phase positions 1, 3 according to step f).

Whereas the point in time 20, the deviation of the point in time 20, and/or the slope 30, for example, can be used as the first feature 19 in the case of a straight line function 24, a parameter of the relevant curve segment 17, for example, can be determined as a feature 19 in the case of a different function 24.

In particular, the at least one first feature 19 is detected in regions of the curve 14 of the second pressure signal 10 that have, e.g., a large slope 30, which is to say specifically not in regions of the extreme values, which is to say of the minima 21 or maxima 22.

In this way, the present method makes possible, in particular, a more robust and more stable result, and in particular a more accurate result, for the actual camshaft phase positions 1, 3.

According to step f), a comparison takes place of the at least one feature 19, for example the deviation of the point in time 20 and/or the slope 30 of the curve 14 in a segment 17 or in a section 23 of a segment 17, with the at least one model 8 or with the corresponding at least one feature in the model 8. As a result, it is thus possible for an actual camshaft phase position 1, 3 to be detected. The values specified by the control unit 38 for the phase positions of the camshafts, which is to say, for example, the first camshaft phase positions 11, can thus be corrected by a correction factor or value so that correct phase positions of the camshafts can be set in subsequent operation of the production internal combustion engine 5.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A method for determining a combination of an actual intake camshaft phase position of an intake camshaft and an actual exhaust camshaft phase position of an exhaust camshaft of a production internal combustion engine that has a plurality of cylinders, wherein the method is performed in operation of the production internal combustion engine and the actual intake camshaft phase position and the actual exhaust camshaft phase position are determined in relation to an operating point of the production internal combustion engine, the method comprising:
   a) determining at least one model on a reference internal combustion engine, wherein the at least one model represents, for at least one operating point of the reference internal combustion engine, a relationship between a first pressure signal detected on the reference internal combustion engine as a function of the actual intake camshaft phase position and an actual exhaust camshaft phase position of the at least one operating point of the reference internal combustion engine;
   b) approaching the operating point of the production internal combustion engine and sensing a second pressure signal at a first intake camshaft phase position and a first exhaust camshaft phase position at least during one operating cycle of the plurality of cylinders;
   c) processing the second pressure signal with a filtering for selection of at least one signal frequency of the second pressure signal so that the at least one signal frequency is representable as a curve of a pressure value over time;
   d) dividing the curve of the second pressure signal of the at least one operating cycle into a plurality of segments, wherein each segment comprises a time interval and provides multiple features matchable with the at least one model;
   e) determining a plurality of features of the second pressure signal in one of the segments, wherein the plurality of features describe the second pressure signal at a point in time within the one of the segments; and
   f) comparing each of the plurality of features with a corresponding feature of the first pressure signal stored in the at least one model, and determining the actual intake camshaft phase position and the actual exhaust camshaft phase position,
   wherein each of the features is associated with individual cylinders of the plurality of cylinders.

2. The method according to claim 1, wherein the division of the curve in step d) takes place into rising segments in which the second pressure signal changes, starting from a low pressure value or a minimum of the second pressure signal to a high pressure value or a maximum of the second pressure signal, and falling segments in which the second pressure signal changes, starting from the high pressure value or the maximum to the low pressure value or the minimum.

3. The method according to claim 1, wherein the time interval of an individual segment of the plurality of segments is determined on the basis of a maximum and a minimum of the curve of the second pressure signal.

4. The method according to claim 1, wherein an association of the plurality of features with a concrete cylinder out of the plurality of cylinders of the production internal combustion engine takes place.

5. The method according to claim 1, wherein in step e), a selection takes place of a region of the second pressure signal that is located between two adjacent extreme values of the second pressure signal or between a maximum and a minimum of the curve, and wherein the region has a section of the curve of the second pressure signal located within the time interval.

6. The method according to claim 5, wherein the section is approximated by a function.

7. The method according to claim 6, wherein an amplitude between the adjacent maximum and the minimum is normalized,
   wherein the section comprises a section time interval in which the curve has at least a first value, which is 50% of the normalized amplitude, as a pressure value,
   wherein the section time interval is defined by a symmetric interval with respect to the normalized amplitude between the maximum and the adjacent minimum,
   wherein the section time interval comprises the curve of the second pressure signal between a second value, which is 30% of the normalized amplitude of the pressure value, and a third value, which is 70% of the normalized amplitude of the pressure value, and
   wherein a greatest slope of the curve is assumed to be present in this section.

8. The method according to claim 7, wherein the approximation of the curve in the section is accomplished by the function that extends from the first value to the second value over the detected section time interval,
   wherein a crossing point of the function with the first value yields a concrete point in time, and
   wherein the point in time is used for determination of the actual intake camshaft phase position and the actual exhaust camshaft phase position according to step f).

9. The method according to claim 1, wherein the plurality of features determined in step e) comprises:
   at least the pressure value and the point in time of a maximum;
   the pressure value and the point in time of a minimum;
   an amplitude of the curve of the second pressure signal;
   a direction of the curve in the one of the segments; and/or
   a slope of the curve in a section of the one of the segments.

10. The method according to claim 1, wherein, in step c), only parts of the second pressure signal are taken into account.

11. The method according to claim 1, wherein, in step c), less than an entirety of the second pressure signal is taken into account.

12. The method according to claim 1, wherein, in step e), the plurality of features of the second pressure signal are individually determined in each of the plurality of segments.

13. The method according to claim 1, wherein said processing the second pressure signal with the filtering comprises processing the second pressure signal with a band-pass filtering as part of a Fourier transform.

14. An internal combustion engine comprising:
   a crankshaft;
   a variable intake camshaft;
   a variable exhaust camshaft;
   a piston connectable to the crankshaft;
   a plurality of cylinders;
   an intake side through which at least air is adapted to be supplied to the plurality of cylinders through at least one intake valve that is actuatable by the variable intake camshaft;

an exhaust side through which exhaust gas is adapted to be removed from the plurality of cylinders through at least one exhaust valve that is actuatable by the variable exhaust camshaft;

at least one pressure sensor to sense pressure signals is arranged on the intake side or on the exhaust side; and a control unit that is adapted to:
  determine at least one model on a reference internal combustion engine, wherein the at least one model represents, for at least one operating point of the reference internal combustion engine, a relationship between a first pressure signal detected on the reference internal combustion engine as a function of the actual intake camshaft phase position and an actual exhaust camshaft phase position of the at least one operating point of the reference internal combustion engine;
  approach an operating point of the production internal combustion engine and sense a second pressure signal at a first intake camshaft phase position and a first exhaust camshaft phase position at least during one operating cycle of the plurality of cylinders;
  process the second pressure signal with a filtering for selection of at least one signal frequency of the second pressure signal so that the at least one signal frequency is representable as a curve of a pressure value over time;
  divide the curve of the second pressure signal of the at least one operating cycle into a plurality of segments, wherein each segment comprises a time interval and provides multiple features matchable with the at least one model;
  determine a plurality of features of the second pressure signal in one of the segments, wherein the plurality of features describe the second pressure signal at a point in time within the one of the segments; and
  compare each of the plurality of features with a corresponding feature of the first pressure signal stored in the at least one model, and determine the actual intake camshaft phase position and the actual exhaust camshaft phase position, wherein each of the features is associated with individual cylinders of the plurality of cylinders.

* * * * *